8349X
A. Merton,
Wood Auger.
Patented Aug. 8, 1834.
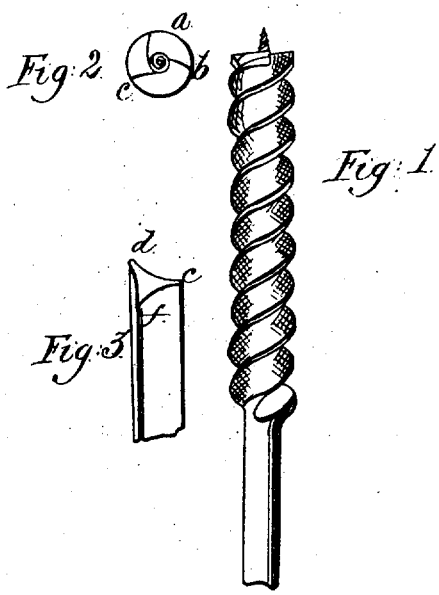

8349x

Aug. 8. 1834 3:

Alfred Newton of Meriden Connecticut
Letters Patent

The Schedule referred to in these Letters Patent and making part of the same containing a description in the words of the said Alfred Newton himself of his improvement in the spiral screw auger.

To all to whom these presents shall come. Know Ye that I, Alfred Newton of Minden in the County of New Haven, State of Connecticut, have invented a new and useful improvement in the Spiral Screw Auger, and that the following is a full and exact description of the construction and operation of the said instrument as invented or improved by me.

That portion of the material used to form the screw, lips, and twist of the improved auger is first forged into a triangular shape in the usual way, then each side of the triangular Rod is depressed or hollowed out by means of a swedge, or in any other convenient way, so that the hollow or depression in the deepest part for an inch auger shall be about three eighths of an inch on each side of the triangle. If the auger to be made is of a larger size, the hollow should be sunk a little lower, if of a smaller size a little less than the above mentioned proportion. This swedgeing or hollowing should not extend quite to the end ~~end~~ where the lips and screw are to be formed, but should leave a small accumulation of metal there to be wrought into the lips and screw. The metal being thus prepared with three concave sides and three edges is twisted into a spiral form in the usual way. On each of the three edges or corners, and at the end thereof out of the metal left there for that purpose is formed a cutting lip or edge, in the usual manner heretofore practised, and in the centre is formed the screw of the auger with three threads, one for each edge or side of the twist and differing from the common screw in shape and mode of formation, only in its having three threads as aforesaid. If the shank and spiral part are made of iron, the screw and lips would need to be made of steel added at the end for that purpose.

Drawing

8349x Aug. 8, 1834

24

Some of the advantages of the instrument thus improved, are additional strength, from the fact that there is an accumulation of metal in the centre of the auger, greater ease in boring from the fact that there are three cutting lips instead of one or two as in other augers, and more steadiness of operation from the fact that the lips are so placed that only one cuts directly across the grain of the wood at the same instant, and each one of the lips operates differently as to the manner of taking the grain at the same moment.

Figure I. in the annexed drawing exhibits a view of the screw, two of the lips and [illegible] the spiral twist and part of the shank. Fig II. Represents an end view of the improved Auger, the screw is seen in the centre, and the lips or cutters at a b c. Fig 3. shews a section of the auger made perpendicularly to the centre and helps to understand the shape which the metal had before it was twisted d e f showing the edges with the hollows or concavities between them. I claim as my improvement, for which I solicit a Patent, the formation of an auger with three lips or cutters and a triple spiral in contradistinction to the augers now made, which so far as I know have hitherto been made with not more than two lips or cutters, and a double spiral formed by twisting a flattened piece of metal. I do not claim the whole instrument as my invention, nor the triple thread in the screw of the auger, nor that I am the inventor of a screw auger or a spiral twist auger whether singly or doubly threaded. but I claim only what I have above stated as an improvement upon such spiral twist and screw augers as are now in use, by the addition and formation of a third cutter, and spiral, securing the advantages above specified and described. In testimony that the above and foregoing is a true specification of my said improvement, I have hereto set my hand at New Haven this 30th day of July 1834.

Witnesses

Isaac H. Tibbals
Benajah Andrews

Alfred Newton

Drawing (806 words)

[illegible]
446.